(12) United States Patent
Murray et al.

(10) Patent No.: US 8,584,373 B2
(45) Date of Patent: Nov. 19, 2013

(54) TAPE RULE BLADE WITH VARIABLE THICKNESS COATING

(75) Inventors: John C. Murray, Canton, CT (US); John Delneo, Middletown, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 28 days.

(21) Appl. No.: 13/238,792

(22) Filed: Sep. 21, 2011

(65) Prior Publication Data

US 2013/0067759 A1   Mar. 21, 2013

(51) Int. Cl.
*G01B 3/10* (2006.01)

(52) U.S. Cl.
USPC .............................................. 33/771; 33/755

(58) Field of Classification Search
USPC ........................................... 33/755, 771, 770
See application file for complete search history.

(56) References Cited

U.S. PATENT DOCUMENTS

| | | | |
|---|---|---|---|
| 2,303,368 A | 12/1942 | Keuffel et al. | |
| 2,471,329 A | 5/1949 | Keuffel | |
| 2,471,395 A | 5/1949 | Keuffel | |
| RE23,133 E * | 7/1949 | Keuffel et al. | ..... 33/771 |
| 2,658,006 A | 11/1953 | Beeber | |
| 2,809,142 A | 10/1957 | Beeber et al. | |
| 3,121,957 A | 2/1964 | Brown | |
| 4,275,503 A * | 6/1981 | Bergkvist | ..... 33/757 |
| 4,911,811 A | 3/1990 | Mullaney, Jr. | |
| 4,931,366 A | 6/1990 | Mullaney, Jr. | |
| 5,746,004 A | 5/1998 | Wertheim | |
| 6,249,986 B1 | 6/2001 | Murray | |
| 6,324,769 B1 * | 12/2001 | Murray | ..... 33/755 |
| 6,440,502 B1 | 8/2002 | Lee | |
| 6,643,947 B2 | 11/2003 | Murray | |
| 6,804,899 B2 | 10/2004 | Murray | |
| 6,807,747 B1 | 10/2004 | Hsu | |
| D507,197 S | 7/2005 | Sun | |
| 7,007,401 B1 | 3/2006 | Lin | |
| 7,062,862 B2 | 6/2006 | Wheaton | |
| 7,159,331 B2 | 1/2007 | Critelli et al. | |
| RE39,719 E | 7/2007 | Murray | |

(Continued)

FOREIGN PATENT DOCUMENTS

EP   1 914 508   4/2008

OTHER PUBLICATIONS

Search Report as issued for European Patent Application No. 12183212.5, dated Dec. 13, 2012.

*Primary Examiner* — Yaritza Guadalupe-McCall
(74) *Attorney, Agent, or Firm* — Pillsbury Winthrop Shaw Pittman LLP (57) ABSTRACT

A tape rule assembly includes a housing; a reel rotatably mounted in the housing; an elongated blade wound on the reel and extendable through an opening in the housing, the blade having a distal end; a hook connected to the blade at the distal end; and a coil spring within the housing and configured to rotate the reel in the housing in a direction to wind up the blade. The elongated blade has a coating provided on at least one side thereof. The coating has a first thickness at a first portion proximate the distal end, a second thickness at a second portion of the blade that is rearward to the first portion and a third thickness at a third portion of the blade that is rearward of the second portion. The second thickness is less than the first thickness and the third thickness is less than the second thickness.

21 Claims, 11 Drawing Sheets

(56) References Cited

U.S. PATENT DOCUMENTS

| | | |
|---|---|---|
| 7,398,604 B2 | 7/2008 | Murray |
| D579,359 S | 10/2008 | Critelli et al. |
| 7,444,759 B1 | 11/2008 | Fleming et al. |
| 7,490,414 B2 | 2/2009 | Critelli et al. |
| 7,565,751 B2 | 7/2009 | Murray |
| D613,629 S | 4/2010 | Suzuki |
| 7,726,039 B2 | 6/2010 | Lee et al. |
| 7,730,630 B1 | 6/2010 | Lamb et al. |
| 8,033,033 B2 * | 10/2011 | Lamb et al. ............ 33/757 |
| 2002/0029489 A1 * | 3/2002 | Murray .................. 33/755 |
| 2002/0078585 A1 * | 6/2002 | Murray .................. 33/755 |
| 2002/0129509 A1 | 9/2002 | Evans |
| 2003/0204966 A1 | 11/2003 | Hsu |
| 2003/0233762 A1 | 12/2003 | Blackman et al. |
| 2004/0071869 A1 | 4/2004 | Gilliam et al. |
| 2005/0028397 A1 | 2/2005 | Blackman et al. |
| 2005/0138829 A1 * | 6/2005 | Critelli et al. ............ 33/755 |
| 2006/0130352 A1 | 6/2006 | Huang |
| 2006/0240195 A1 | 10/2006 | Gilliam et al. |
| 2007/0006476 A1 | 1/2007 | Critelli et al. |
| 2008/0067075 A1 | 3/2008 | Zia |
| 2008/0086902 A1 | 4/2008 | Murray |
| 2011/0179661 A1 | 7/2011 | Delneo et al. |
| 2011/0179664 A1 | 7/2011 | Delneo et al. |

* cited by examiner

TAPE RULE BLADE WITH VARIABLE THICKNESS COATING

BACKGROUND

Field

The present disclosure relates to tape rule assemblies.

A typical tape rule assembly includes an elongated thin metal rule blade or measuring tape that is mounted on a reel rotatably disposed within a housing. The rule blade is wound on a reel in the housing by an internal coil spring. To measure a work-piece or distance, a length of the rule blade is pulled out of the housing to span the work-piece or distance to be measured so that gradation lines and/or numbers printed on the blade can be read. To measure a distance between two objects or surfaces, a blade hook at the free end of the blade may be temporarily secured or placed against an object or surface.

The present disclosure provides several improvements over the prior art.

SUMMARY

One aspect of the present disclosure provides a tape rule assembly that includes a housing, a reel rotatably mounted in the housing, an elongated blade wound on the reel and extendable through an opening in the housing, the blade having a distal end, a hook connected to the blade at the distal end, and a coil spring within the housing and configured to rotate the reel in the housing in a direction to wind up the blade. The elongated blade has a coating provided on at least one side thereof. The coating has a first thickness at a first portion proximate the distal end, a second thickness at a second portion of the blade that is rearward to the first portion and a third thickness at a third portion of the blade that is rearward of the second portion. The second thickness is less than the first thickness and the third thickness is less than the second thickness.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated can be considered are drawn to scale. It is to be expressly understood, however, that the drawings are for the purpose of illustration and description only and are not intended as a definition of the limits of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE DRAWINGS

FIGS. 1-7B and 13 show a tape rule assembly 10 in accordance with an embodiment of the present disclosure. The tape rule assembly 10 includes a housing 12, a reel 14 rotatably mounted in the housing 12, an elongated blade 16 wound on the reel 14 and extendable through an opening 22 in the housing 12, the blade 16 having a distal end 20, a hook 34 connected to the blade 16 at the distal end 20, and a coil spring 32 within the housing 12 and configured to rotate the reel 14 in the housing 12 in a direction to wind up the blade 16. The elongated blade 16 has a coating 250 provided on at least one side 252 or 254 thereof. The coating 250 has a first thickness $T_1$ at a first portion 256 proximate the distal end 20, a second thickness $T_2$ at a second portion 258 of the blade 16 that is rearward to the first portion 256, and a third thickness $T_3$ at a third portion 260 of the blade 16 that is rearward of the second portion 258. The second thickness $T_2$ is less than the first thickness $T_1$ and the third thickness $T_3$ is less than the second thickness $T_2$. In addition, the coating 250 may optionally have even thinner portions (thinner than $T_3$) at regions of the blade 16 that are further away from the distal end 20 of the blade 16. In addition, in other embodiments, rather than the coating thickness being reduced in a step-wise manner, the coating 250 may be made thinner in a continuous manner, such that it reduces in thickness as it extends away from the distal end 20. See, for example, the embodiment of FIG. 7A. In one embodiment, the continuous reduction in thickness exists for substantially full length of the blade 16. In another embodiment, the continuous reduction in thickness, or the step-wise reduction in thickness, exists for only a portion of the blade 16.

Figure 7A:
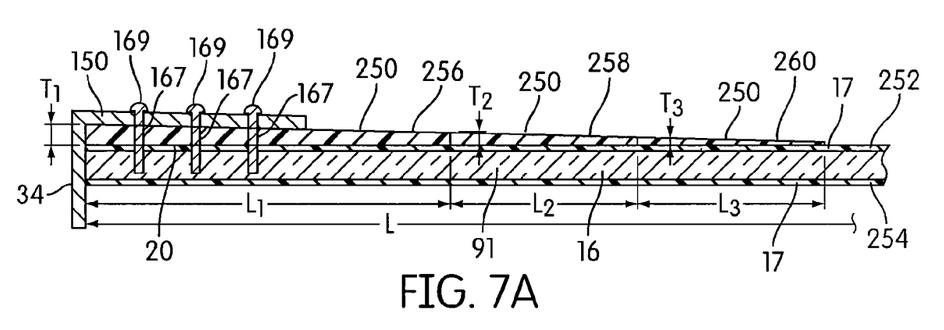
FIG. 7A shows a cross-section of configuration of the blade with coating on concave side thereof, wherein the coating is made thinner in a continuous manner such that it reduces in thickness as it extends away from distal end of the blade in accordance with an embodiment of the present disclosure.

In terms of the continuously reducing thickness coating will still have a first thickness $T_1$ at the first portion 256 of the blade 16 proximate the distal end 20, a second thickness $T_2$ that is rearward of the first portion 256 (and thinner than the first portion 256), and a third thickness $T_3$ at the third portion 260 of the blade 16 that is rearward of the second portion 258 (and thinner than the second portion 258). In one non-limiting embodiment, the first, second and third portions 256, 258, and 260 of the blade 16 at which coating thickness measurements are taken can be anywhere along the length of the blade 16. In another embodiment, the continuously reducing thickness exists only on portions of the blade 16. For example, in one embodiment, the diminishing coating thickness exists for less than one-half the blade length.

Figure 4:
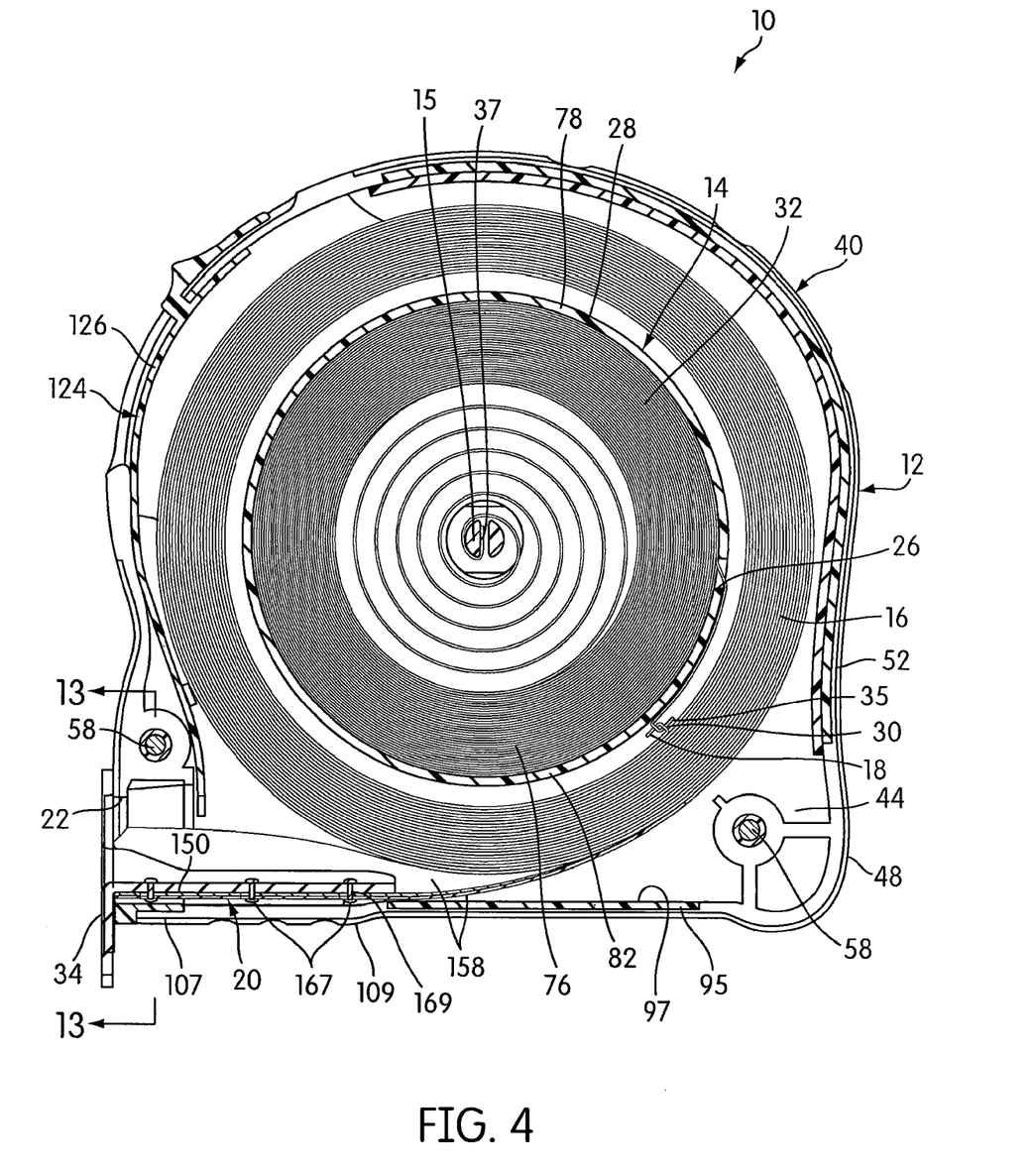
FIG. 4 shows a cross-sectional view of the tape rule assembly taken through the line 4-4 in FIG. 2 showing a blade thereof in a fully retracted configuration in accordance with an embodiment of the present invention.
Figure 5:
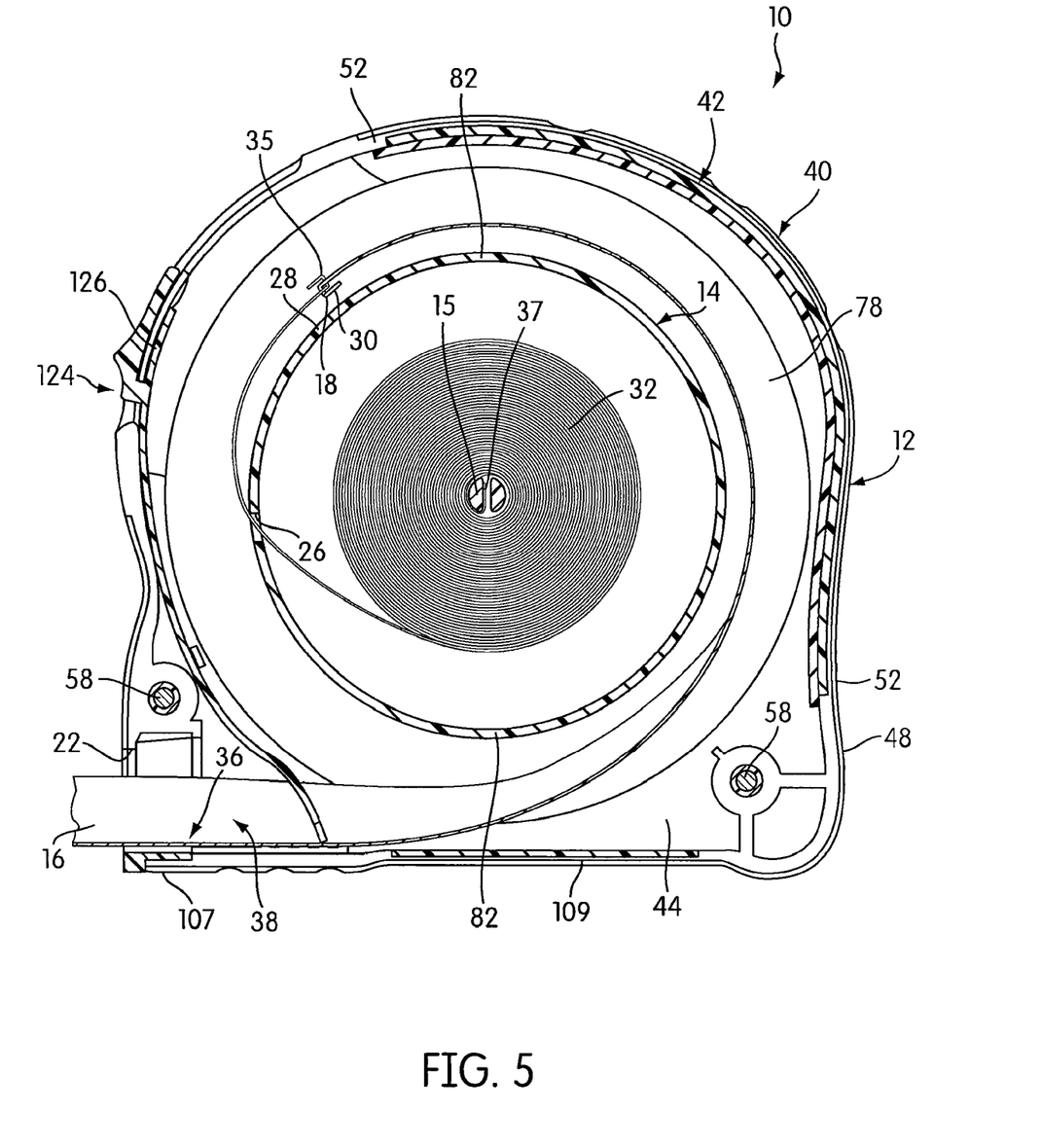
FIG. 5 is a view similar to FIG. 4 except showing the blade in a fully extended configuration in accordance with an embodiment of the present invention.
Figure 6:
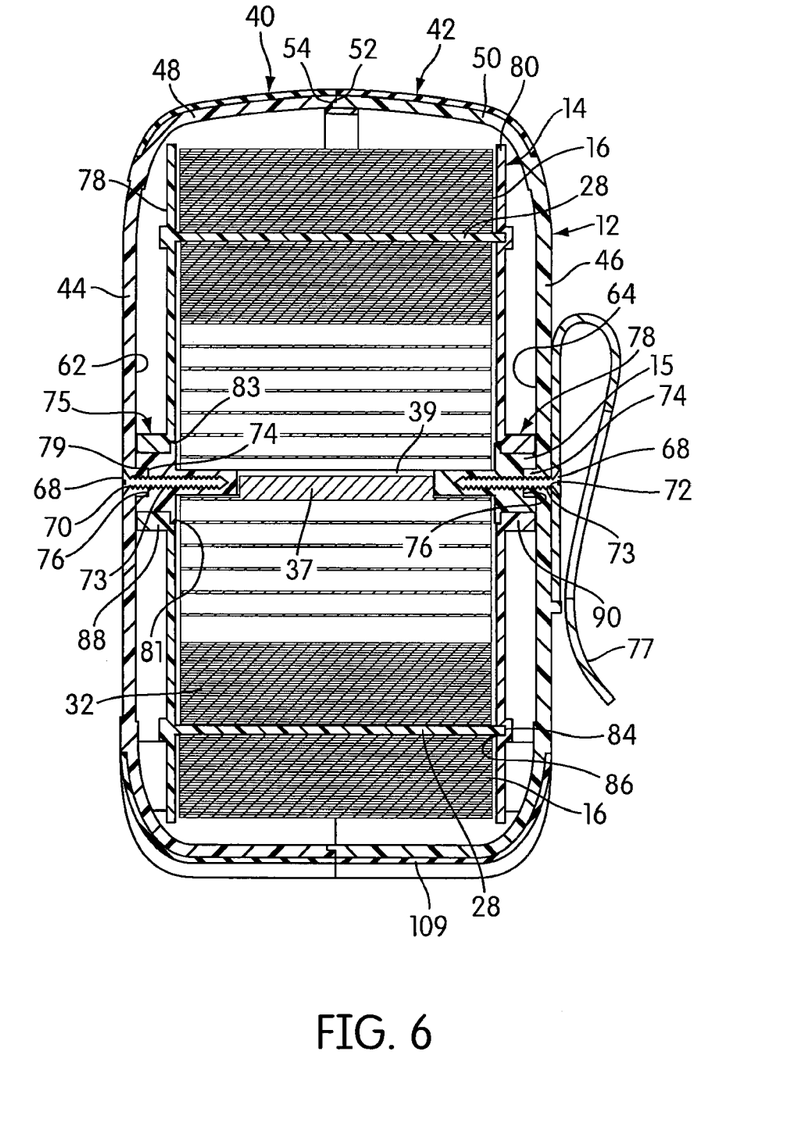
FIG. 6 is a cross-sectional view taken through the line 6-6 in FIG. 3.

In one embodiment, the housing 12 is constructed to easily and comfortably fit in a hand of the user and houses the measuring tape or blade 16, a retraction or return spring 32 (as shown in FIGS. 4, 5 and 6) and other cooperating components. The details of the internal structure of the housing 12 and the measuring tape or blade 16 mounted therein are shown in FIGS. 4, 5 and 6.

In one embodiment, the housing 12 is constructed of, for example, a molded plastic material. In various embodiments, the housing 12, for example, may be of the type described in commonly assigned U.S. Patent Application Ser. No. 61/475,121, which is hereby incorporated by reference in its entirety.

As shown in FIG. 6, the housing 12 includes a pair of cooperating housing members 40, 42. Each housing member 40, 42 includes an end wall 44, 46, respectively, and a peripheral wall 48, 50, respectively, extending from a periphery of the end walls and terminating in a free edge 52, 54, respectively. The pair of cooperating housing members 40, 42 are joined to one another in cooperating relation to define the housing 12.

When the housing members 40, 42 are fixed together in the assembled rule assembly 10, the free edges 52, 54 are interengaged as shown in FIG. 6. As shown in FIGS. 4 and 5, a plurality of axially extending fasteners 58 extend through one of the housing members 42 and threadedly engage the other housing member 40 at spaced positions in the respective end walls 44, 46 adjacent the peripheral walls 48, 50.

A clip 77 may be secured to one side of the housing 12 by fasteners or bolts 68. The clip 77 can be used to attach the rule assembly 10 to the belt of a user, or other attachment point. In one embodiment, the belt clip 77 is made from, for example, a metal material.

As can be appreciated from FIGS. 4 and 5, the reel 14 is rotatable in the housing 12 and the measuring tape 16 is wound on the reel 14. The reel 14 is mounted in the housing 12 by the axle or reel spindle 15.

In one embodiment, the reel 14 is provided with a slot or an opening 26 in a central cylindrical wall portion 28 thereof. One end 18 of the blade 16 terminates in a hook-like structure 30 that engages a first longitudinal end 35 of the return spring 32 to connect the end 18 of the blade 16 to the return spring 32 (FIGS. 4 and 5).

The reel 14 includes two reel members 78, 80 (FIG. 6) that provide circular side walls and cylindrical wall portion or hub 28 about which the blade or measuring tape 16 is wound.

In one embodiment, each reel member 78, 80 includes an outwardly extending cylindrical wall portion 88, 90, respectively, formed at least near a position at which the reel spindle or axle 15 joins the housing 12. In one embodiment, an annular edge portion 84 on the wall portion 82 is received within an annular groove 86 formed within the reel member 80 to help hold the reel 14 together, although other areas and types of connections are contemplated.

The axle or reel spindle 15 extends within the housing 12. The reel 14 is rotatably mounted on the axle or reel spindle 15. The axially extending spindle 15 is fixed at a central portion of the housing 12. In one embodiment, the fixed spindle 15 has a noncircular interengaging recess-projection connection (shown in FIG. 6 and described below) at each end thereof generally with a central interior region 62, 64, respectively, of the end walls 44, 46 of the housing 12. Each end of the fixed spindle 15 is interiorly threaded to threadedly receive the bolts 68 therein. The bolts 68 extend through central holes 70, 72 formed in the respective adjacent end walls 44, 46 of the housing 12 and threadedly engage internal threading 73 in each end of the spindle 15. Each bolt 68 extends through a recess-projection connection 75, when each bolt 68 is disposed in a respective central hole 70, 72 and threaded interior 73.

The construction of the recess-projection connections 75 between the ends of the spindle 15 and the walls 44, 46 is shown in cross-section in FIG. 6. Each recess-projection connection 75 is identical. In one embodiment, projections 74 having exterior noncircular cross-sections are integrally formed on the walls 44, 46 and are received within recesses 76 having complementary non-circular interior cross-sections formed on each end of the spindle 15. The noncircular interior and exterior cross-sections cooperate to prevent rotation of the spindle 15 with respect to the housing 12 when the ends of the spindle 15 are mounted on the projections 74 in the assembled rule assembly 10.

In the embodiment of FIG. 6, each end of the spindle 15 extends through a hole 79 of circular cross-section formed in opposite sides of the reel 14. The portions of the spindle 15 that extend through the holes 79 in the reel 14 have cylindrical outer surfaces. A flange 81 on the spindle 15 engages an annular groove 83 in the reel 14 surrounding the hole or opening 79 to guide the rotation of the reel on the spindle. Thus, the reel 14 is rotatably mounted on the spindle 15 for bi-directional rotational movement of the reel 14. As shown in FIGS. 4 and 6, the spindle 15 is internally slotted to receive the one longitudinal end 37 of the spring 32 to thereby secure the one end 37 of the spring 32 to the spindle 15.

The retraction spring 32 is constructed and arranged between the housing 12 and the reel 14 to rotate the reel 14 with respect to the housing 12 in a direction to wind the elongated blade 16 about the reel 14 into the housing 12. The retraction spring 32 is generally enclosed within the central wall portion 28 of the reel 14 (FIGS. 4, 5 and 6). The first longitudinal end 35 of the retraction spring 32 extends through the opening 26 and engages the first longitudinal end 18 of the blade 16, and the second longitudinal end 37 of the retraction spring 32 hookingly engages within a slot 39 formed in the spindle 15 to fix the end 37 of the spring 32. In one embodiment, the spring 32 is a thin, flat ribbon of metal (e.g., the metal being steel).

In one embodiment, the blade 16 is formed of a ribbon of metal (e.g., the metal being steel), and the top concave surface of the blade is printed with measuring lines and digits (not shown) for measuring lengths and distances. The blade 16 is wound on the reel 14 and the distal end of the blade 16 is arranged to extend outwardly through the opening 22 provided in the housing 12 (as shown, for example, in FIG. 1).

The blade or measuring tape 16 is generally movable between a fully retracted position and a fully extended position. The fully retracted position of the blade 16 is shown in FIG. 4 and the fully extended position of the blade is shown (in fragmentary view) in FIG. 5. It can be appreciated from a comparison of FIG. 4 and FIG. 5 that as the blade is unwound from the reel 14, the spring 32 is wound more tightly around the rigidly fixed axle or reel spindle 15. This winding of the spring around the spindle stores energy in the spring to provide spring powered rewinding of the blade 16 around the reel 14 when the extended blade is released.

The blade 16 is constructed of a ribbon of sheet metal 91 that is shaped during the manufacturing to have a normal or memory configuration that has a generally arcuate or concavo-convex transverse cross-section. In one embodiment, the thickness of the elongated blade 16 may be within the range of 0.0045 to 0.0063 inches. The blade 16 also comprises a paint layer 17 provided on the metal base material 91, and the coating 250 as will be described later. When a portion of the blade 16 is wound about the reel 14, the wound portion has a flat transverse cross-section and the wound layers of the coiled blade provide the wound blade with an abutting volute coil configuration. In other words, when the blade 16 is wound around the reel 14, it has the flat cross-section and when the blade 16 is withdrawn from the housing 12 to measure an object, it returns to the concavo-convex cross-section. Thus, the spring 32 is constructed and arranged between the housing 12 (or the spindle 15) and the reel 14 to rotate the reel 14 about the axle or reel spindle 15 in a direction to wind up the elongated blade 16 when extending outwardly of the housing opening 22 in a normal concavo-convex cross-sectional configuration onto the reel 14 in an abutting volute coil formation in a flattened cross-sectional configuration.

In various embodiments, the blade 16 can be of the type described in commonly assigned U.S. Pat. No. 6,324,769, which is hereby incorporated by reference in its entirety. In another embodiment, the blade may not include a concavo-convex cross-section but may include any other cross-sectional configurations.

The free end of the blade 16 is frequently handled by the user and this handling can over time cause the numbering and markings provided by the paint layer 17 on the concave side 252 of the blade 16 to wear off or become difficult to read. When applied to the concave side 252 of the blade, the coating 250 of the present disclosure prevents this because it covers the paint layer 17 of the blade 16 and thereby protects the same.

The housing 12 includes a fitment 118 (FIG. 13) which forms a part of the housing opening 22 adjacent the convex side 254 of the blade 16. The fitment 118 is an essentially U-shaped structure having a transversely extending cross member 115 and two upstanding arms 117 extending upwardly from opposite sides of the cross member 115. The cross member 115 defines the lower edge of the housing opening 22; a bottom surface 170 of the cross member 115 is flush with the adjacent surface portion 107 of the bottom wall 109 so that a bottom surface portion of the fitment 118 forms part of the bottom surface of the housing 12 adjacent the opening 22. The fitment 118 may be an integral molded plastic structure. The fitment 118 is held within appropriately sized opposing recesses 121,123 (FIG. 13) formed in the respective housing members 40, 42 and which recesses are disposed on opposite sides of the opening 22 when the housing members 40, 42 are secured together. The cross member 115 of the fitment 118 has a plurality of tangentially extending, transversely spaced elongated ridges 120 which define surfaces 125 along the bottom of the opening 22 for engaging and supporting the convex side 254 of the blade 16 extending tangentially from the reel 14 of the housing assembly opening 22. Thus, the ridges 120 slidably engage the convex side 254 of the blade 16 and provide a low friction engagement between the housing 12 and blade 16.

Figure 1:
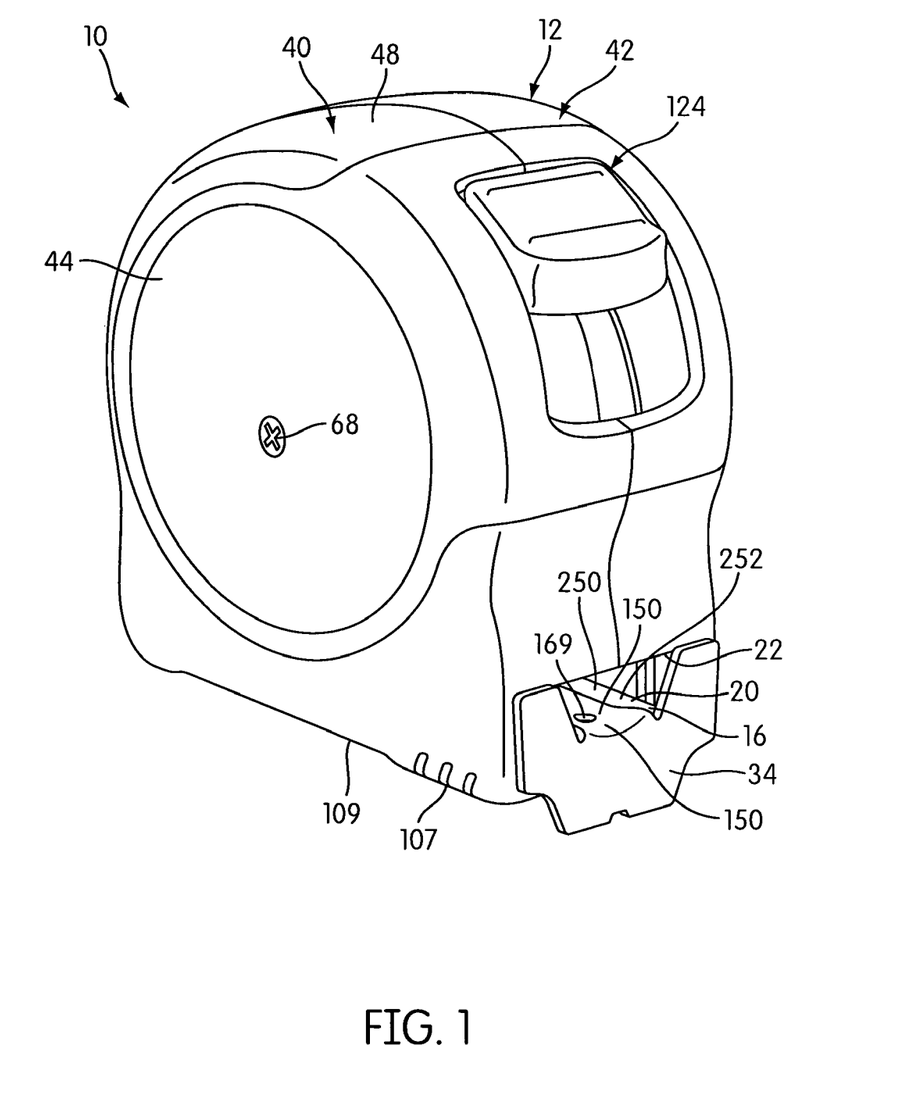
FIG. 1 shows a perspective view of a tape rule assembly in accordance with an embodiment of the present disclosure.
Figure 2:
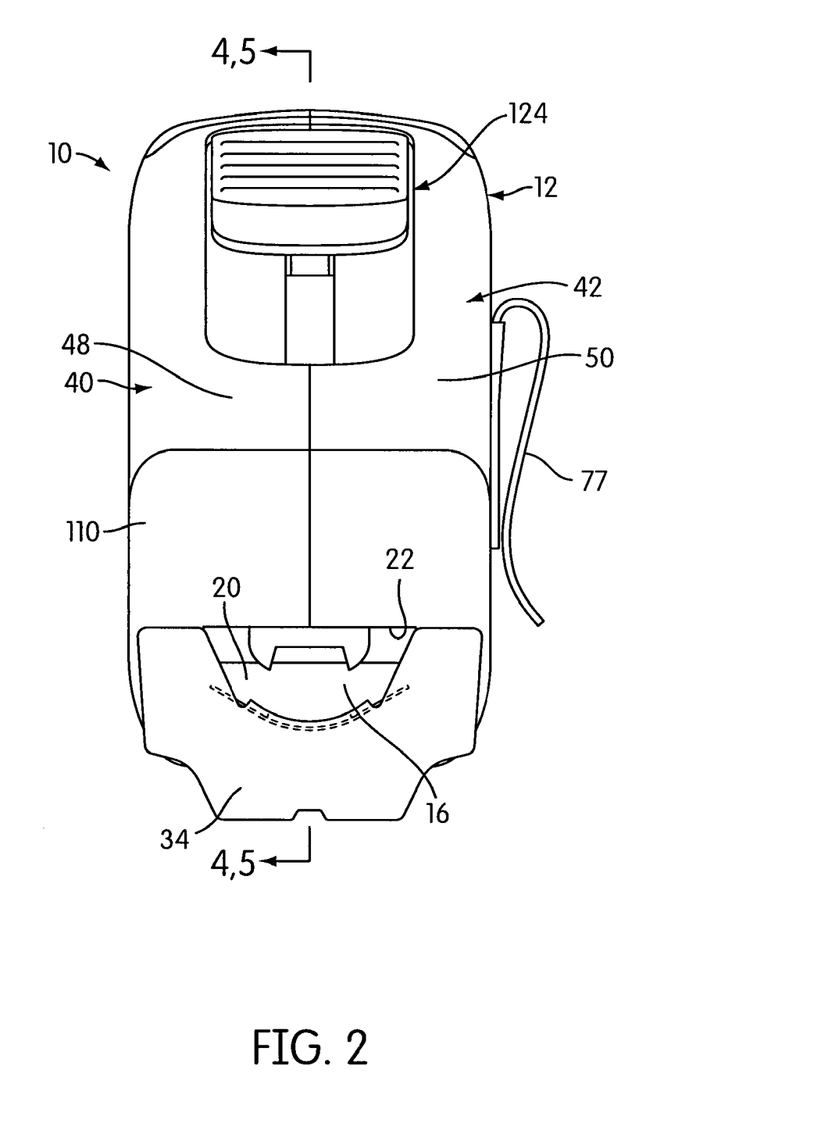
FIG. 2 shows a front of elevational view of the rule assembly in accordance with an embodiment of the present invention.
Figure 3:
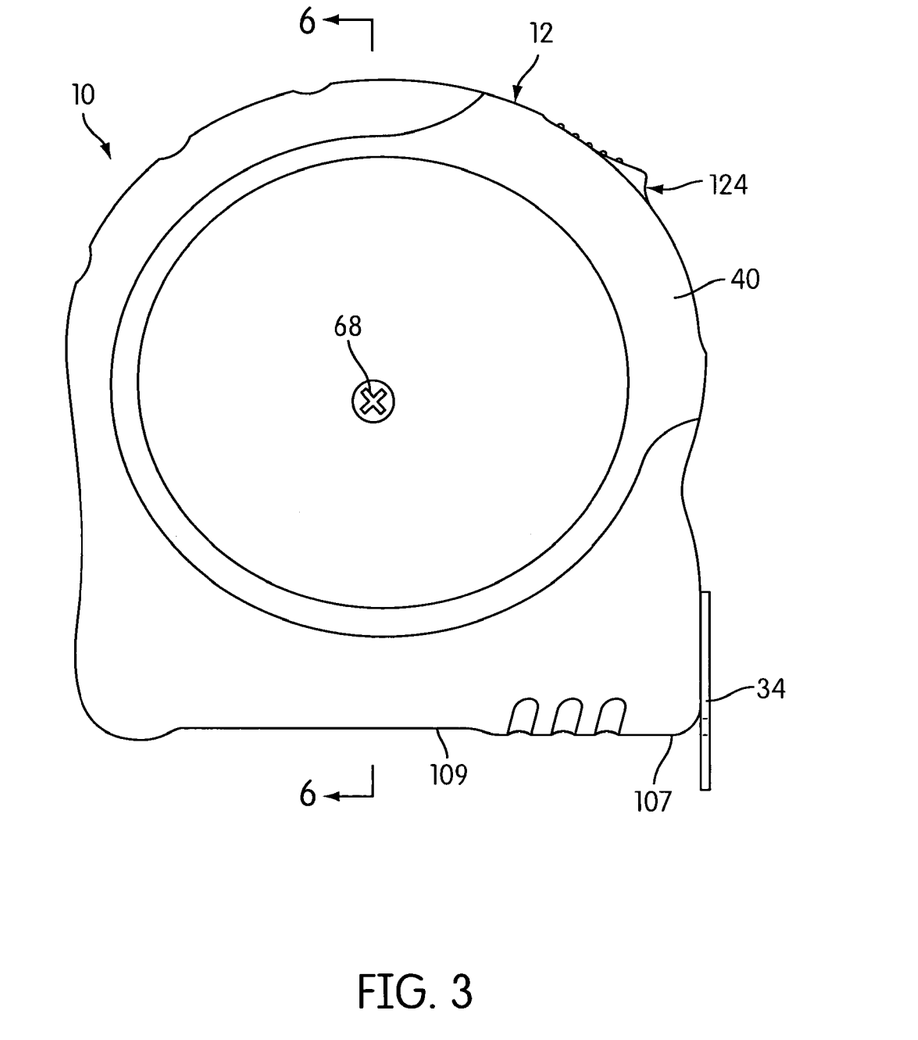
FIG. 3 shows a side of elevational view of the rule assembly in accordance with an embodiment of the present invention.

The elongated blade 16 has the end hook member 34 (FIGS. 1 and 4) on the free end 20 thereof. The elongated blade 16 is arranged to be wound on the reel 14 and to be extendable through the opening 22 in the housing 12. As shown in FIGS. 1-3, the end hook member 34 is mounted on the free end 20 of the blade 16 with the mounting portion 150 thereof secured in engagement with a concave (upper) side of the free end 20 of the blade 16 and in overlying relation thereto. The mounting portion 150 is provided with large holes 167 and a plurality of rivets 169 extend through the holes 167 to mount the end hook member 34 to the blade 16. In one embodiment, the blade hook, for example, may be of the type disclosed in U.S. patent application Ser. No. 12/898, 275 or 12/898,352, hereby incorporated by reference in their entirety.

In one embodiment, a holding assembly 124 is constructed and arranged to be manually actuated to hold the blade or measuring tape 16 in any position of extension outwardly of the housing opening 22 and to release the blade 16 from any position in which it is held. The structure and operation of the holding assembly 124 is best appreciated from a comparison of FIGS. 4 and 5. The holding assembly 124 includes a holding member 126 mounted on the housing 12 for movement in opposite directions between a normally inoperative position (FIG. 4) and a holding position (FIG. 5). In one embodiment, the holding assembly 124 can be of the type, for example, described in commonly assigned U.S. Pat. No. 6,324,769, which is hereby incorporated by reference in its entirety.

Figure 7B:
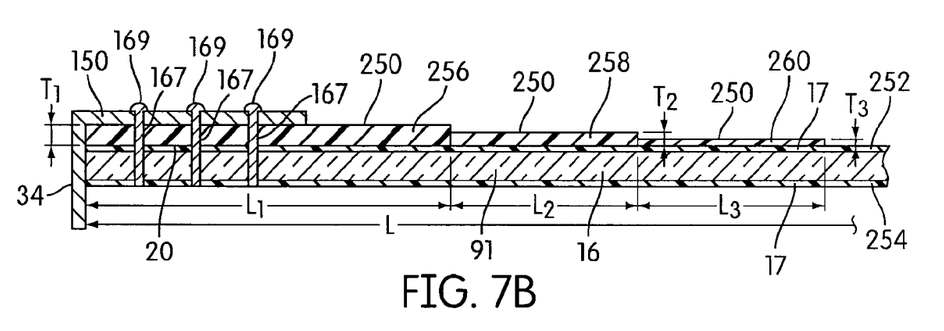
FIG. 7B shows a cross-section of configuration of the blade with coating on the concave side thereof, wherein the coating is made thinner in a step-wise manner in accordance with an embodiment of the present disclosure.

FIG. 7A and FIG. 7B show cross-section configurations of the blade 16 with the coating 250 on the concave side 252 thereof. In FIG. 7A, the coating 250 is made thinner in a continuous manner such that it reduces in thickness as it extends away from distal end of the blade, while the coating 250 in FIG. 7B is made thinner in a step-wise manner.

The blade 16 has a layer of paint on both sides 252 and 254 thereof, with the paint on the concave side 252 of the blade 16 providing measuring indicia. In one embodiment, the paint layer 17 on each side 252 or 254 of the blade 16 preferably has a thickness of about 0.0006 inches-0.0014 inches. In one embodiment, a water-based paint or a solvent-based paint may be used. In some embodiments, a wear resistant paint or ink may be used to provide the measuring indicia.

In one embodiment, in order to reduce wear and/or prevent corrosion and rust, the paint layer 17 on both sides 252 and 254 of the blade 16 is coated with the protective coating 250. That is, the protective coating 250 is provided on the paint layer 17 of the blade 16.

The coating 250 encapsulates the measuring indicia provided by the paint layer 17. That is, in one embodiment, the measuring indicia are painted on the blade 16, and the painted indicia is encapsulated between the metal blade material 91 and the coating 250. In one embodiment, the coating 250 may provide a wear-resistant layer that reduces or inhibits wear of the measuring indicia on the blade 16. It also may provide a sealing function to inhibit rust formation on the blade 16.

In one embodiment, the protective coating 250 is self-adhering. In another embodiment, an acrylic adhesive may be used to adhere the coating 250 to the blade 16 (i.e., over the paint layer 17). In yet another embodiment, heated or ultraviolet (U.V) processes may be used to adhere the coating 250 to the blade 16 (i.e., over the paint layer 17).

In one embodiment, the coating 250 is made from a non-metallic material. In another embodiment, any appropriate flexible or semi-flexible material may be used for the coating 250, including Mylar®, Polyester, Nylon®, Lacquer or Acrylic. In some embodiments, an appropriate thermoset, rubber, thermoplastic, thermoplastic elastomer, polyamide, polyvinyl, silicone, polyimide, polyethylene, fluoropolymer, polycarbonate or polyethylene terephthalate may be also used, for example.

The coating 250 has a first thickness $T_1$ at a first portion 256 proximate the distal end 20, a second thickness $T_2$ at a second portion 258 of the blade 16 that is rearward to the first portion 256, and a third thickness $T_3$ at a third portion 260 of the blade 16 that is rearward of the second portion 258.

Figure 8:
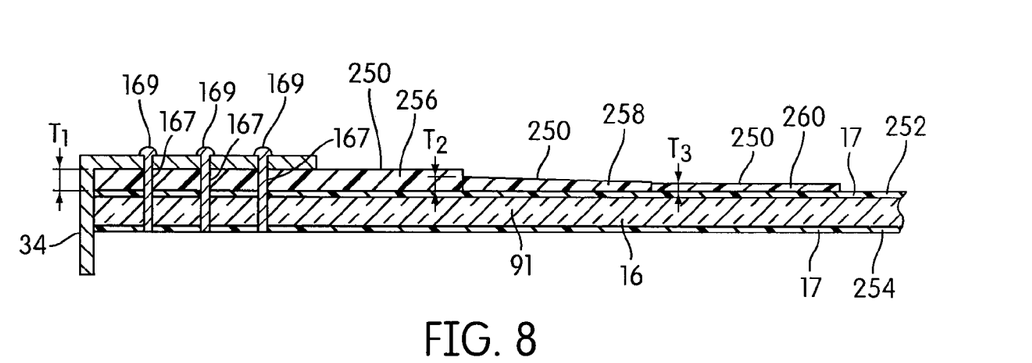
FIG. 8 shows a cross-section of configuration of the blade with coating on the concave side thereof, wherein first and third thicknesses of the coating are substantially uniform, while second thickness of the coating is substantially variable (tapered) in accordance with an embodiment of the present disclosure.
Figure 9:
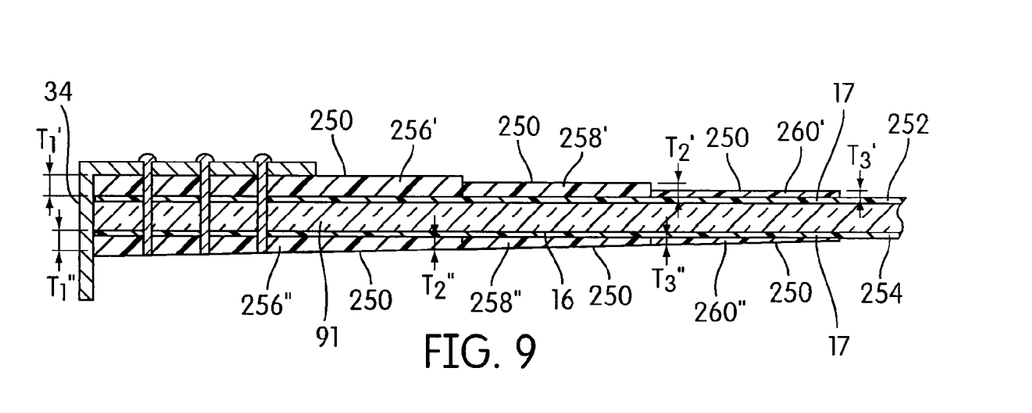
FIG. 9 shows a cross-section of configuration of the blade with coating on both concave side and convex side thereof, wherein the coating on the concave side is made thinner in a step-wise manner, while the coating on the convex side is made thinner in a continuous manner in accordance with an embodiment of the present disclosure.

In the illustrated embodiment, shown in FIGS. 7-9, the coating 250 may include three portions 256, 258 and 260 having thicknesses $T_1$, $T_2$ and $T_3$, respectively. However, the number of variable thickness portions that are located along the length of the blade 16 can vary significantly in number. For example, in other embodiments, the coating 250 may include two variable thickness portions or four (or more) variable thickness portions. In one embodiment, the first portion 256, the second portion 258, and the third portion 260 are adjacent each other to provide a coating that is continuous in length.

In one embodiment, the second thickness $T_2$ is less than the first thickness $T_1$ and the third thickness $T_3$ is less than the second thickness $T_2$ and the first thickness $T_1$. The coating 250 is thicker at the distal blade end 20 of the blade 16 and has reduced thickness away from the distal blade end 20 of the blade 16. In an embodiment where a continuous decreasing thickness is provided, the largest thickness may be greater than 0.003 inches, and the smallest thickness bay be less than 0.0005 inches. In one embodiment, the thickness range may be between 0.005 and 0.0003 inches.

In one embodiment, the first thickness $T_1$ is generally between about 0.005 inches and about 0.002 inches, the second thickness $T_2$ is generally between about 0.002 inches and about 0.0005 inches, and the third thickness $T_3$ is generally between about 0.0005 inches and about 0.0003 inches.

In one embodiment, the length of the first portion 256 is $L_1$, the length of the second portion 258 is $L_2$ and the length of the third portion 260 is $L_3$. In one embodiment, the lengths $L_1$, $L_2$, $L_3$ of the first, second and third portions 256, 258 and 260 are substantially the same. In another embodiment, the lengths $L_1$, $L_2$, $L_3$ of the first, second and third portions 256, 258 and 260 are different from each other.

In one embodiment, the first thickness coating is placed over several leading inches of the free end 20 of the blade 16, including the portion of the blade 16 on which the hook member 34 is disposed so that the first thickness coating goes under the hook member 34 all the way to the free end 20 of the blade 16. In one embodiment, the length $L_1$ of the first thickness coating may range generally between approximately 2 inches to approximately 18 inches.

In one embodiment, the coating 250 covers substantially an entire length L of the blade 16. In such an embodiment, the sum of the lengths of the first, second and third portions 256, 258 and 260 is equal to the entire length L of the blade 16. That is, $L_1+L_2+L_3=L$.

In another embodiment, the coating 250 extends along a portion of the entire length L of the blade 16. In such an embodiment, the sum of the lengths of the first, second and third portions 256, 258 and 260 is less than the entire length L of the blade 16. That is, $L_1+L_2+L_3<L$. For example, the coating 250 may extend about one-half, about two-thirds, about three-fourths, or any other portion of the entire length L of the blade 16. A range of between about 25% to about 100% of the entire length L of the blade 16 may provide an increase in the blade life (durability) while maintaining ergonomically compact grippable outer housing.

In one embodiment, as shown in FIG. 7B, the first thickness $T_1$ is substantially uniform along the length $L_1$ of the first portion 256, the second thickness $T_2$ is substantially uniform along the length $L_2$ of the second portion 258, and the third thickness $T_3$ is substantially uniform along the $L_3$ of the third portion 260. In such an embodiment, as shown in FIG. 7B, the coating 250 has a stepped cross-sectional configuration.

In another embodiment, as shown in FIG. 7A, the first thickness $T_1$ is substantially variable along the along the length $L_1$ of the first portion 256, the second thickness $T_2$ is substantially variable along the length $L_2$ of the second portion 258, and the third thickness $T_3$ is substantially variable along the $L_3$ of the third portion 260. That is, the first, second and the third thicknesses $T_1$, $T_2$ and $T_3$ are substantially variable along their respective lengths $L_1$, $L_2$, and $L_3$ in a direction perpendicular to the length of the blade 16.

For example, the first thickness $T_1$ may gradually taper along the length $L_1$ of the first portion 256. That is, the first thickness coating has a first taper thickness at one end of the first portion 256 and a second taper thickness at the other end of the first portion 256. The first taper thickness is equal to the first thickness $T_1$, while the second taper thickness is less than the first thickness $T_1$ and is at least equal to or greater than the second thickness $T_2$. Also, the second thickness $T_2$ may gradually taper along the length $L_2$ of the second portion 258, and the third thickness $T_3$ may gradually taper along the $L_3$ of the third portion 260.

In one embodiment, one or more of the first, the second and the third thicknesses $T_1$, $T_2$ and $T_3$ are substantially uniform, and the other of the first, the second and the third thicknesses $T_1$, $T_2$ and $T_3$ are substantially variable. That is, the coating 250 may include a combination of substantially tapered variable thicknesses and substantially continuous or uniform thicknesses. For example, in the illustrated embodiment of FIG. 8, the first and the third thicknesses $T_1$ and $T_3$ of the coating 250 are substantially continuous or uniform, while the second thickness $T_2$ of the coating 250 is substantially variable or tapered.

In the illustrated embodiment, as shown in FIG. 7B, the coating 250 is provided on the concave side 252 of the blade 16. In another embodiment, as shown in FIG. 9, the coating 250 may be provided on both the concave side 252 and the convex side 254 of the blade 16. In yet another embodiment, the coating 250 is provided on the convex side 254 of the blade 16.

In one embodiment, as shown in FIG. 9, first, second and third thicknesses $T_1'$, $T_2'$ and $T_3'$ of the coating 250 on the concave side 252 are substantially uniform, while first, second and third thicknesses $T_1''$, $T_2''$ and $T_3''$ of the coating 250 on the convex side 254 are substantially variable. In another embodiment, first, second and third thicknesses $T_1'$, $T_2'$ and $T_3'$ of the coating 250 on the concave side 252 are substantially variable, while first, second and third thicknesses $T_1''$, $T_2''$ and $T_3''$ of the coating 250 on the convex side 254 are substantially uniform.

In one embodiment, one or more of first, second and third thicknesses $T_1'$, $T_2'$ and $T_3'$ on the concave side 252 of the blade 16 are substantially uniform, and the other of the first, the second and the third thicknesses $T_1'$, $T_2'$ and $T_3'$ on the concave side 252 of the blade 16 are substantially variable. In another embodiment, one or more of first, second and third thicknesses $T_1''$, $T_2''$ and $T_3''$ on the convex side 254 of the blade 16 are substantially uniform, and the other of the first, the second and the third thicknesses $T_1''$, $T_2''$ and $T_3''$ on the convex side 254 of the blade 16 are substantially variable.

The coating 250 of the present disclosure has a plurality of parallel transverse cross-section with variable thicknesses $T_1$, $T_2$ and $T_3$ provided on opposing concave side 252 and/or convex side 254 of the blade 16.

In one embodiment, the coating 250 is made from a non-opaque material to permit reading of measuring indicia beneath it. In another embodiment, the coating 250 is made from an optically translucent material.

Though the coating 250 may be clear or non-opaque to permit reading of measuring indicia beneath it, it may also be opaque, particularly in the case where it is on the convex side 254 of the blade 16. Moreover, if an opaque coating is used on the concave side 252 of the blade, it may itself contain the measuring indicia for that portion of the blade 16, so that even if the coating obscures printed indicia (or portions thereof) on the blade 16, the device can still be readily used.

In one embodiment, the first thickness coating, the second thickness coating, and the third thickness coating have different transparency levels. In another embodiment, the first thickness coating, the second thickness coating, and the third thickness coating have a same transparency level.

In one embodiment, the first thickness coating, the second thickness coating, and the third thickness coating have different colors. In another embodiment, the first thickness coating, the second thickness coating, and the third thickness coating have a same color.

In one embodiment, the first thickness coating, the second thickness coating, and the third thickness coating have non-continuous or discontinuous color. In another embodiment, the first thickness coating, the second thickness coating, and the third thickness coating have continuous color.

In one embodiment, the first thickness coating, the second thickness coating, and the third thickness coating have different texture and/or different finish. For example, the coating may include varying surface textures, such as a rough (or bumpy) surface texture. In another embodiment, the first thickness coating, the second thickness coating, and the third thickness coating have a same texture and/or finish. The texture and finish may provide aesthetically pleasing effects.

Figure 10:
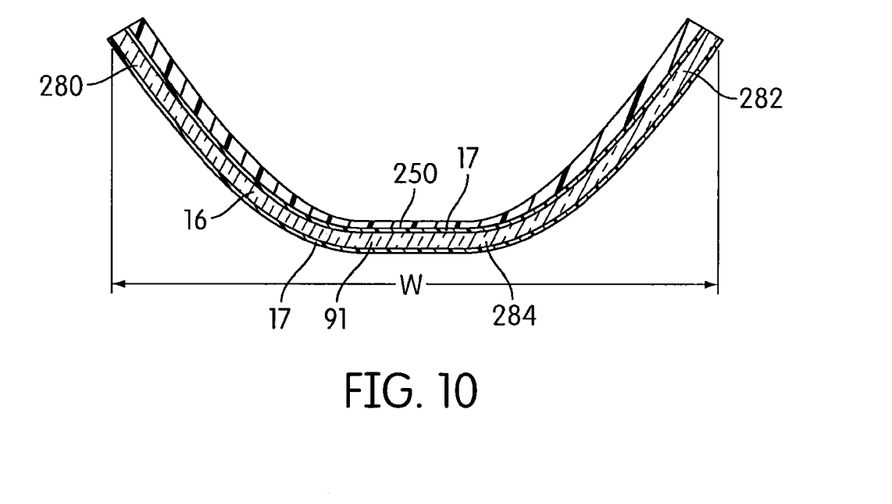
FIG. 10 shows a transverse cross-sectional view taken through a portion of the extended blade, wherein the coating at transverse edge sections of the blade is thicker than at a central section of the blade in accordance with an embodiment of the present disclosure.
Figure 11:
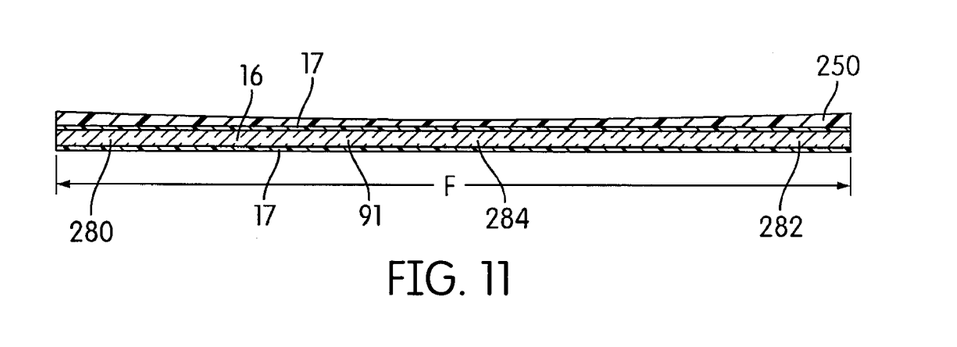
FIG. 11 shows a transverse cross-sectional view taken through a portion of the blade, when the blade is in a flattened configuration, with the coating thereon in accordance with an embodiment of the present disclosure.
Figure 11A:
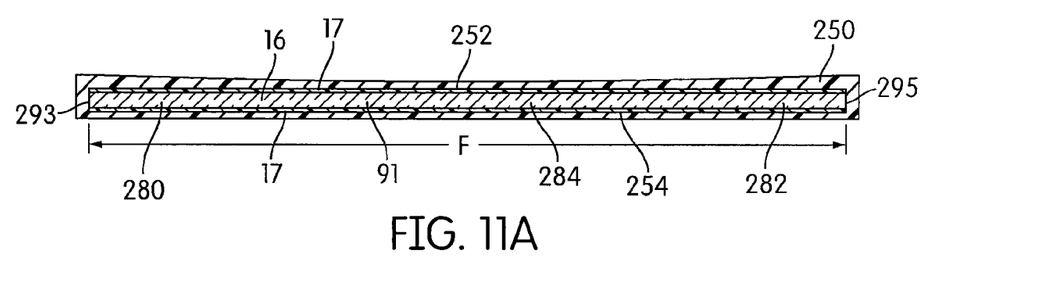
FIG. 11A shows a transverse cross-sectional view taken through a portion of the blade, wherein the coating extends from the concave side to side edges and then onto the convex side in accordance with an embodiment of the present disclosure.

FIG. 10 shows a transverse cross-sectional view taken through a portion of the extended blade and FIGS. 11 and 11A show transverse cross-sectional views taken through a portion of the blade when the blade is in a flattened configuration. Referring to FIGS. 10, 11 and 11A, the blade 16 has a curved or arcuate width W when the blade is in an extended (concavo-convex cross-section) configuration and has a width F when the blade is in a flattened configuration. Also, referring to FIG. 10, the concavo-convex cross-sectional configuration of the blade 16 includes an arcuate central section 284 and integral arcuate end sections 280 and 282. In one embodiment, the radii of curvature for the two end sections 280 and 282 are greater than the radius of curvature of the central section 284. In one embodiment, as shown in FIG. 10, the coating 250 at transverse edge sections 280 and 282 of the blade 16 is thicker than at a central section 284 of the blade 16.

In FIG. 11A, the coating 250 extends beyond the transverse edge sections 280 and 282 on the concave side 252. That is, the coating 250 on the concave side 252 extends onto side edges sections 293 and 295 and then onto the convex side 254. In one embodiment, the coating 250 is thicker on the concave side 252 and the side edge sections 293 and 295 and is thinner on the convex side 254. In one embodiment, the coating 250, on the convex side 254, has uniform thickness, while the coating 250, on the concave side 252, has varying thickness (e.g., the coating 250 at transverse edge sections 280 and 282 is thicker than at the central section 284 on the concave side 252 of the blade 16).

Figure 14:
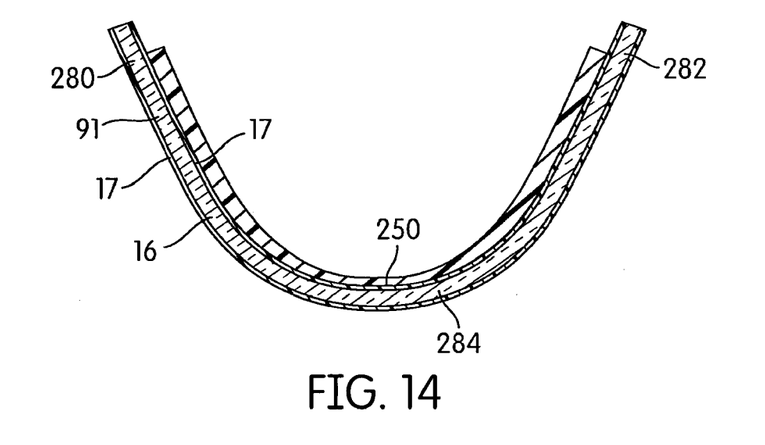
FIG. 14 shows another transverse cross-sectional view taken through a portion of the extended blade, wherein the coating covers only a portion of the width of the blade in accordance with an embodiment of the present disclosure.

In one embodiment, as shown in FIGS. 10, 11 and 11A, the coating 250 covers about 100% of the blade width W. In another embodiment, as shown in FIG. 14, the coating 250 may cover only a portion of the width of the blade 16. A range of between about 25% to about 100% may provide an increase in the blade life while reducing the amount of material necessary to provide the coating.

In one embodiment, the coating 250 may include at least one reinforcing member. In one embodiment, as shown in FIG. 12, the reinforcing member is a fiber 286.

Figure 12:
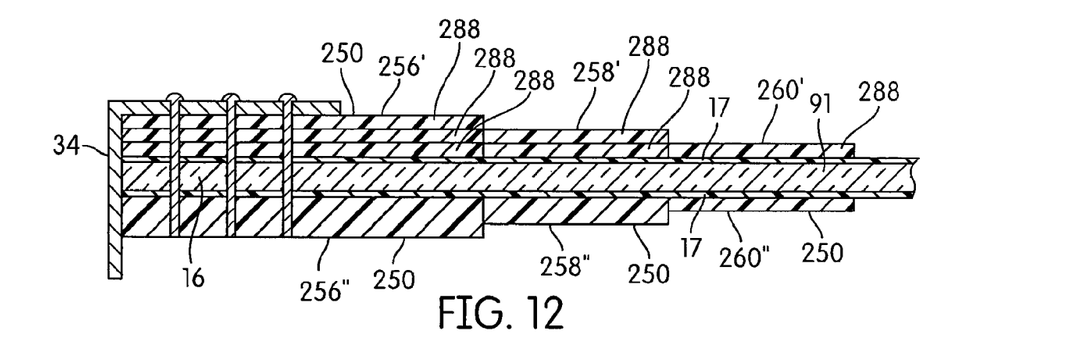
FIG. 12 shows another cross-section of configuration of the blade with coating on both concave side and convex side thereof, wherein the coating includes a plurality of sub-layers in accordance with an embodiment of the present disclosure.
Figure 13:
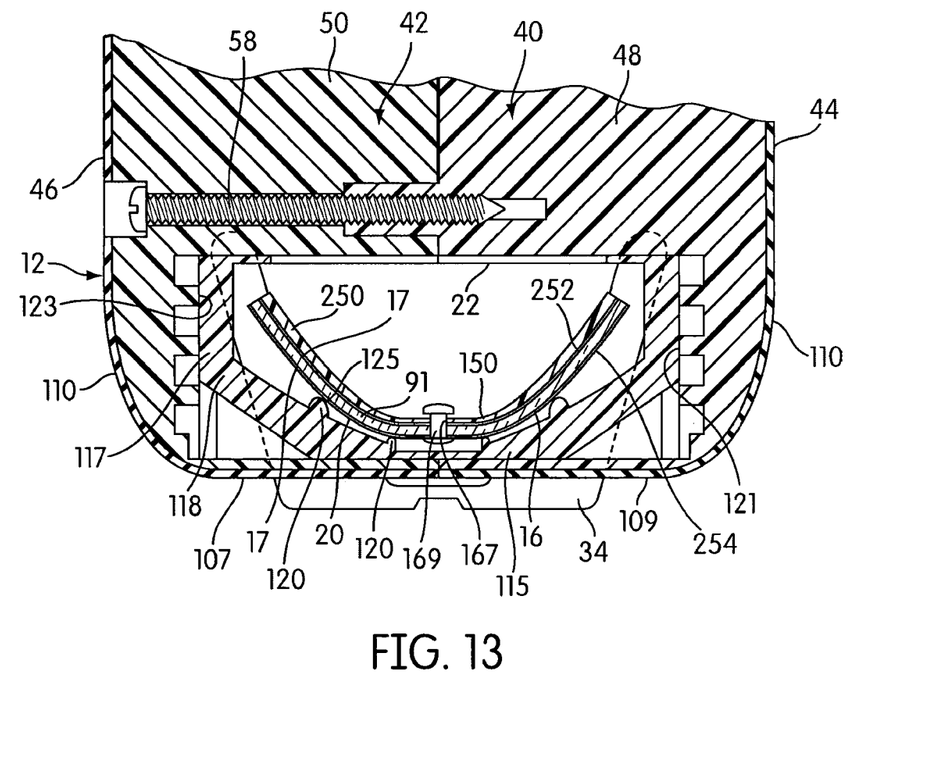
FIG. 13 shows a cross-section view of a fragment of the tape rule assembly taken through the line 13-13 of FIG. 4.

In one embodiment, as shown in FIG. 12, the coating 250 may include a plurality of sub-layers 288. The sub-layers 288 may be formed into the coating 250 prior to attachment to the blade 16, or may alternately be individually attached to the blade in an iterative process. In one embodiment, the sub-layers 288 have different coating materials. In another embodiment, the sub-layers have same coating material.

One skilled in the art will understand that the embodiment of the rule assembly 10 shown in the figures and described above is exemplary only and not intended to be limiting. It is within the scope of the present disclosure to provide any known rule assembly with any or all of the features of the present disclosure. For example, the coating constructed according to the principles of the present disclosure can be applied to any known rule assembly.

In one embodiment, the variable blade coating of the present disclosure enables a thicker protective coating at the distal blade end and a thinner coating at the blade tail end. The thicker coating enables enhanced protective utility where the blade is used in its highest cyclical measuring lengths and also highest potentially detrimental forceful impact zones, while minimizing coating thicknesses in zones with lower cyclical measuring lengths and impact zones both enabling a more durable blade within ergonomically compact grippable outer hand tool housing.

Although the present disclosure has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment can be combined with one or more features of any other embodiment.

What is claimed is:
1. A tape rule assembly comprising:
a housing;
a reel rotatably mounted in the housing;

an elongated blade wound on the reel and extendable through an opening in the housing, the blade having a distal end;

a hook connected to the blade at the distal end; and a coil spring within the housing and configured to rotate the reel in the housing in a direction to wind up the blade;

the elongated blade having a coating provided on at least one side thereof, wherein the coating has a first thickness at a first portion proximate the distal end, a second thickness at a second portion of the blade that is rearward to the first portion, the second thickness being less than the first thickness, and a third thickness at a third portion of the blade that is rearward of the second portion, the third thickness being less than the second thickness.

2. The tape rule assembly of claim 1, wherein the coating has a maximum thickness at a region at and/or proximate to the distal end and becomes continuously thinner as the coating extends rearwards on the blade.

3. The tape rule assembly of claim 1, wherein the first thickness is substantially uniform along the first portion, the second thickness is substantially uniform along the second portion, and the third thickness is substantially uniform along the third portion.

4. The tape rule assembly of claim 1, wherein the first thickness is substantially variable along the first portion, the second thickness is substantially variable along the second portion, and the third thickness is substantially variable along the third portion.

5. The tape rule assembly of claim 4, wherein the first, the second and the third thicknesses are variable in a direction perpendicular to a length of the blade.

6. The tape rule assembly of claim 1, wherein one or more of the first, the second and the third thicknesses are substantially uniform, and the other of the first, the second and the third thicknesses are substantially variable.

7. The tape rule assembly of claim 1, wherein the blade has a concavo-convex configuration when extended from the housing.

8. The tape rule assembly of claim 7, wherein the coating is provided on both the concave side and the convex side of the blade.

9. The tape rule assembly of claim 8, wherein first, second and third thicknesses of the coating on the concave side are substantially uniform, and first, second and third thicknesses of the coating on the convex side are substantially variable, or vice versa.

10. The tape rule assembly of claim 1, wherein the coating is made from a non-metallic material.

11. The tape rule assembly of claim 1, wherein the coating is made from a non-opaque material or an optically translucent material.

12. The tape rule assembly of claim 1, wherein the first portion is adjacent to the second portion and the second portion is adjacent to the third portion.

13. The tape rule assembly of claim 1, wherein one or more of the first, the second, and the third thicknesses have two or more colors.

14. The tape rule assembly of claim 1, wherein the first thickness coating, the second thickness coating, and the third thickness coating have a same color.

15. The tape rule assembly of claim 1, wherein the first thickness coating, the second thickness coating, and the third thickness coating have different texture and/or different finish.

16. The tape rule assembly of claim 1, wherein the first thickness coating, the second thickness coating, and the third thickness coating have a same texture and/or finish.

17. The tape rule assembly of claim 1, wherein the first thickness coating, the second thickness coating, and the third thickness coating have different transparency levels.

18. The tape rule assembly of claim 1, wherein the first thickness coating, the second thickness coating, and the third thickness coating have a same transparency level.

19. The tape rule assembly of claim 1, wherein the coating comprises at least one reinforcing member.

20. The tape rule assembly of claim 1, wherein measuring indicia is provided between the blade and the coating.

21. The tape rule assembly of claim 1, wherein, at one or more of the first, the second and the third portions, the coating at transverse edge sections of the blade is thicker than at a central section of the blade.

* * * * *